INVENTOR.
Frank L. Clement and
Charles W. Watson
BY W. Lee Helms
ATTORNEY

Feb. 20, 1951 F. L. CLEMENT ET AL 2,542,795
WINCH-LIFT TRAILER
Filed July 10, 1947 2 Sheets-Sheet 2
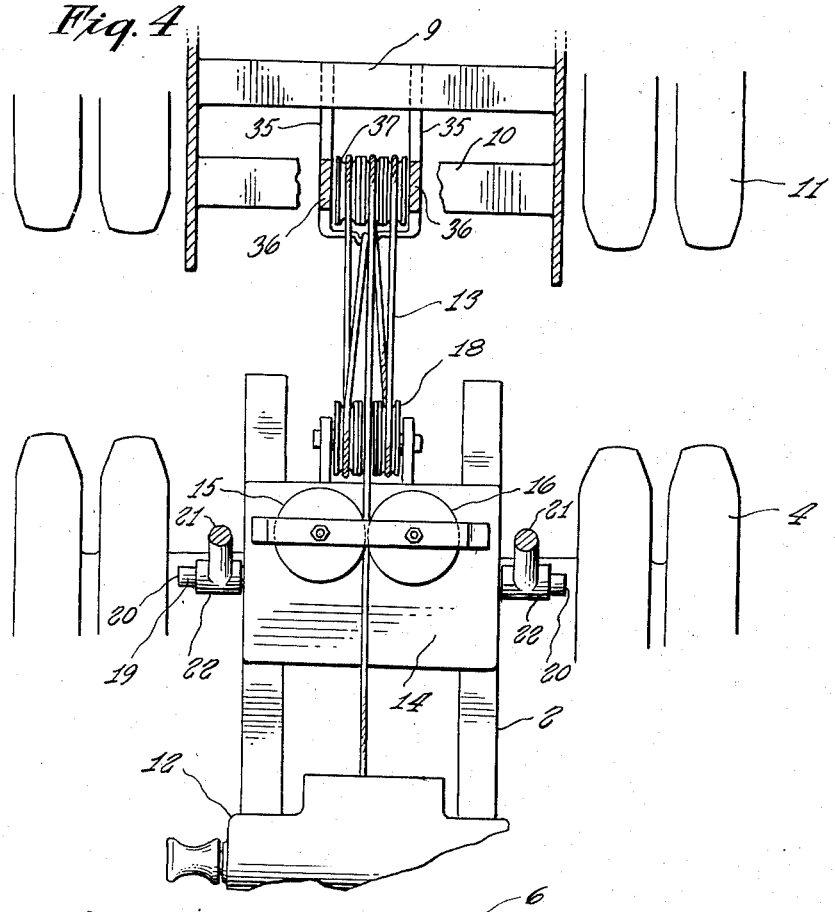
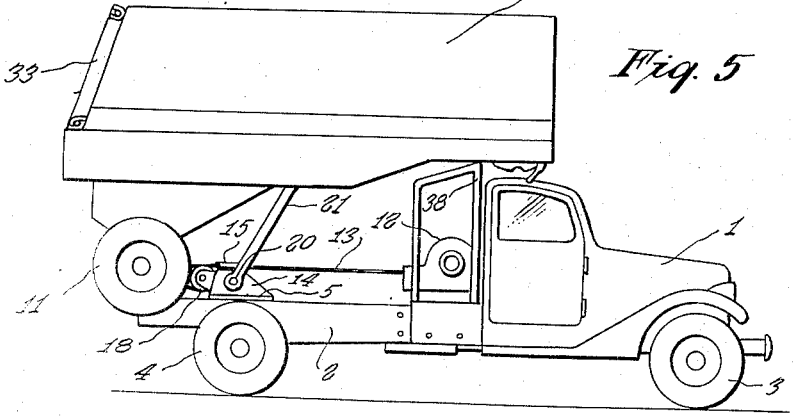
INVENTOR.
Frank L. Clement and
Charles W. Watson
BY
N. Lee Helms
ATTORNEY Patented Feb. 20, 1951

2,542,795

UNITED STATES PATENT OFFICE 2,542,795

WINCH-LIFT TRAILER

Frank L. Clement and Charles W. Watson,
Minden, La.

Application July 10, 1947, Serial No. 760,166

2 Claims. (Cl. 298—1)

The object of the present invention is to provide a winch-lift trailer in combination with a truck of any desired type, the trailer being particularly adapted for the transport of heavy materials capable of being dumped, as for example, sand, gravel, coal and other granular materials.

An object of the present invention is to enable a dumping operation of the trailer without the use of hydraulic lifts or other complicated devices, and to employ the wheels of the trailer itself as primary lifting elements in coaction with a set of levers which are actuated by movement of the trailer body on its wheels through the action of a cable arrangement connected to a winch or power driven drum carried by the truck.

Still another object of this invention is to provide a winch-lift trailer which eliminates that portion of the chassis used to support the trailer body and thus increases the pay load of the trailer.

Another object of this invention is to provide a winch-lift trailer which can lift and suspend said trailer body above the motor body for parking said trailer in a small parking area.

Still another object of this invention is to provide a winch-lift trailer which has a novel locking arrangement for automatically locking the drop door in the closed position when said trailer body has been lowered to the traveling position.

Other objects and advantages will appear from the following description considered in connection with the accompanying drawings in which:

Figure 4 is a vertical transverse section on the line 4—4, Figure 2;

Figure 5 is a diagrammatic view in side elevation showing a carried position of the trailer relatively to the truck made possible by the invention.

Figure 1:
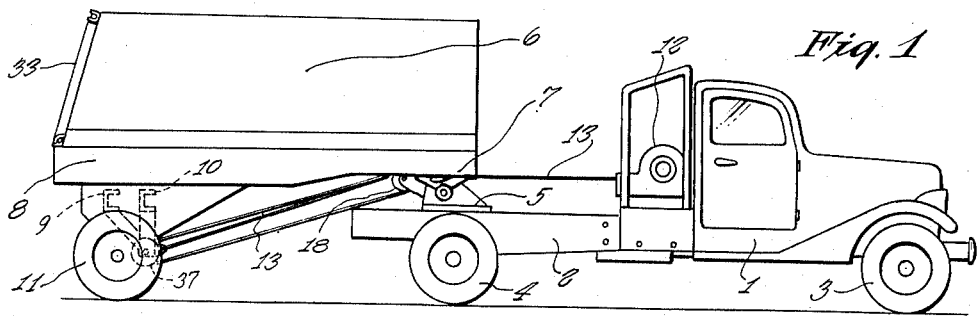
Figure 1 is a diagrammatic view in side elevation showing an embodiment in outline and a winch, cable, sheave and lever combination characteristic of the invention, the trailer being in normal transport position.

Referring now to the drawings and in particular to the winch-lift trailer shown in Figure 1, this winch-lift trailer comprises a motor truck 1, having a chassis 2 which is supported by paired front and rear wheels 3 and 4. Bolted to said chassis 2 between the two rear wheels 4, is a metal platform 5. A trailer 6 has its front end 7 resting on said chassis platform 5 while the rear end 8 rests on cross-beams 9 and 10 which in turn are supported by the rear wheels 11 of the equipment.

Figure 2:
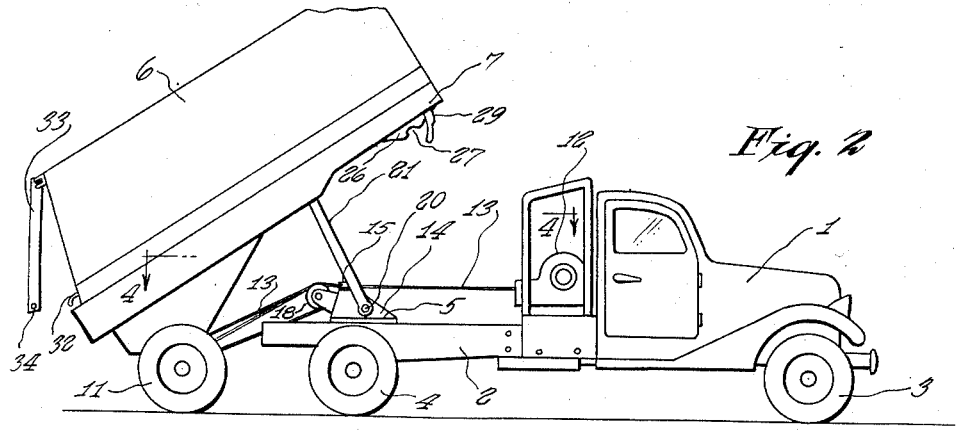
Figure 2 is a side elevation showing the dump trailer in dumping position.
Figure 3:
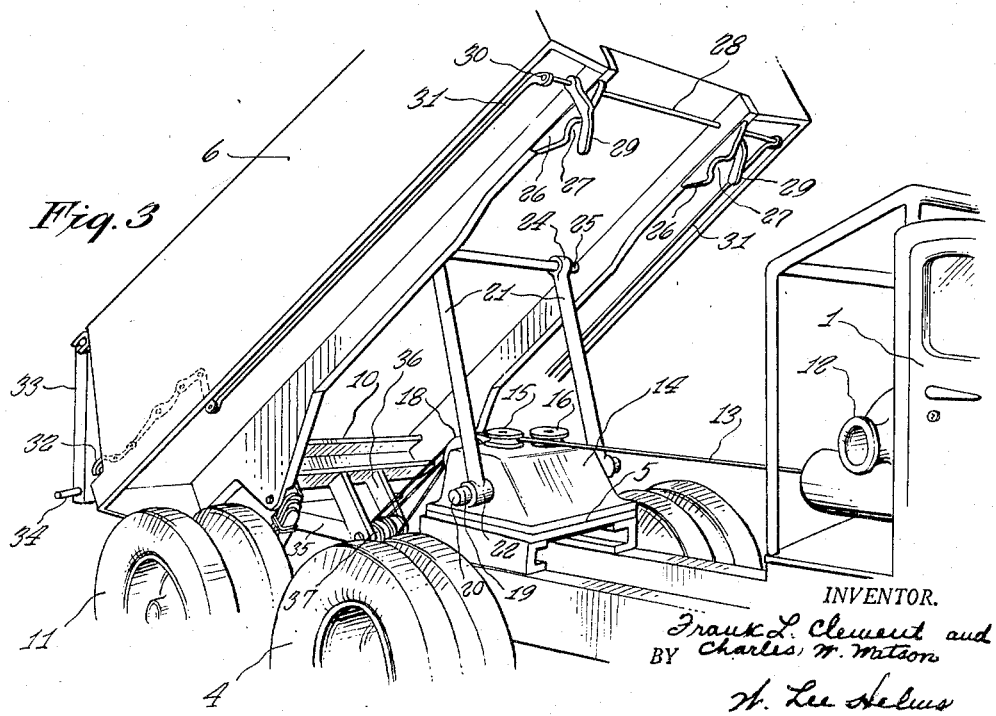
Figure 3 is a perspective view showing the under side of the dump body and certain operative elements in the position of Figure 2.

The raised position of the trailer shown in Figures 2 and 3 reveals the operating mechanism of our invention. An actuating winch 12 which is operated by the truck motor has a cable 13 wound around said winch 12. A rotating swivel base 14 is attached to the top of said stationary chassis platform 5. On the top of said swivel base 14, is affixed a pair of pulleys 15 and 16 whose rims are in contact with each other at substantially the center of said top of said swivel base 14.

Attached to the rear vertical wall 17 of said swivel base 14, is a multiple wheel block and tackle 18. A rod 19 extends horizontally through said swivel base 14 so that said rod 19 is parallel to the truck axles. The ends 20 of said rod 19 project outward from said swivel base 14. A pair of thrust rods 21, having tubular ends 22 which are set at right angles to said thrust rods 21 are attached between said swivel base 14 and the underbody 23 of the trailer 6. This is accomplished by attaching the tubular ends 22 of said thrust rods 21 to the ends 20 of swivel base rod 19 while the other ends 24 of said thrust rods 21 are formed to swivel in bearings 25 attached to the underbody 23. Near the front end 7 underneath said trailer 6, are placed paired metal buffers 26 having notches 27 therein adapted to engage the ends 20 of said swivel base rod 19 when said trailer body 7 is in the down position. A rotating rod 28 having paired curved levers 29 attached thereto extends beneath and along the width of said trailer body 7. The ends 30 of said rotating rod 28 are attached at right angles to parallel lever rods 31 which extend the length of said trailer body 7 and are connected to the locking latches 32 which are adapted to lock the tail drop door 33 when said trailer body 7 is horizontal and ready for loading or travel. Rods 34 projecting from either end of said tail drop door 33 are adapted to be locked in said locking latches 32 described above.

Attached to cross-beams 9 and 10, are vertical supporting girders 35 and 36 which support a multiple pulley 37 situated slightly in front of, and horizontally aligned with, said rear axle 38 of trailer wheels 11.

Said cable 13 is attached to the motor winch 12 and is threaded between said pulleys 15 and 16, around said multiple pulleys 18 and 37 to make a block and tackle arrangement in which said pulley 18 is stationary while the pulley 37 and its load are movable. Said trailer body 7 is swiveled at its rear end in the usual dump trailer fashion.

Figure 5 of the winch-lift trailer shows the trailer body 7 raised above the motor truck 1 by means of the cable 13 and thrust rods 21 for storage or garaging purposes within a limited area. Said trailer body 7 is locked to the metal cab protector 38 by means of any suitable latching lever well known in the art.

As will be seen from the above description, the invention discloses a winch-lift trailer which presents a novel mechanism for dumping purposes, without the use of hydraulic lifts or other complicated devices in which the wheels of the trailer itself are utilized in connection with a set of levers to provide the necessary lifting power.

In addition, this invention provides a winch-lift trailer which decreases the over-all weight of the structure by eliminating the chassis base commonly used as a support for the trailer body. Furthermore, said winch lifting device has sufficient flexibility to lift and suspend said trailer body above the motor body for parking said trailer in a limited parking area.

While, in disclosing the principles of our invention and its preferred embodiment, we have described various detailed structure and relationship, it will be understood that such embodiment and details are given by way of example only and not as limiting the scope of our invention.

Having described our invention, what we claim and desire to secure by Letters Patent, is as follows:

1. A winch lift dumping trailer vehicle comprising a motor chassis, a swivel base attached to the end of said chassis, a trailer body having a plurality of supporting wheels at one end, said body being adapted to swivel at the wheel end, the opposite end of said trailer being supported on said swivel base, and means for tilting the trailer body to dumping position and for lifting said trailer body to a position above said motor chassis for storage of said vehicle in a limited space, said means comprising an axle supported horizontally by said swivel base, a plurality of lever rods pivotally carried by the ends of said axle, swivel means adapted to hold the said lever rods to the under side of said trailer body, and means for pulling said trailer body-supporting wheels and the trailer body towards the swivel base end of the chassis body.

2. A winch-lift trailer comprising a motor chassis body, a swivel base attached to the end of said chassis body, a trailer body having a plurality of supporting wheels at one end, said trailer body being adapted to swivel at the wheel end, the other end of said trailer body being supported on said swivel base, a rod-like axle arranged horizontally through said swivel base, a plurality of lever rods pivotally connected to the ends of said rod-like axle, swivel means adapted to hold the other ends of said lever rods to the underside of said trailer body, means for pulling said trailer body supporting wheels toward the swivel base end of said chassis body, and notched elements attached to the underside of said trailer body and adapted to cooperate with the ends of said axle for holding the front end of said trailer body to the swivel base of said motor chassis body.

FRANK L. CLEMENT.
CHARLES W. WATSON.

REFERENCES CITED

The following references are of record in the file of this patent:

UNITED STATES PATENTS

| Number | Name | Date |
| --- | --- | --- |
| 1,333,293 | Clark et al. | Mar. 9, 1920 |
| 1,554,509 | Kearney | Sept. 22, 1925 |
| 2,148,798 | Barrett | Feb. 28, 1939 |
| 2,309,787 | Quintin et al. | Feb. 2, 1943 |
| 2,514,726 | Schonrock | July 11, 1950 |